March 17, 1964     F. S. J. LEIGH ETAL     3,125,622
CONDUCTORS FOR ARC FURNACES
Filed July 14, 1961
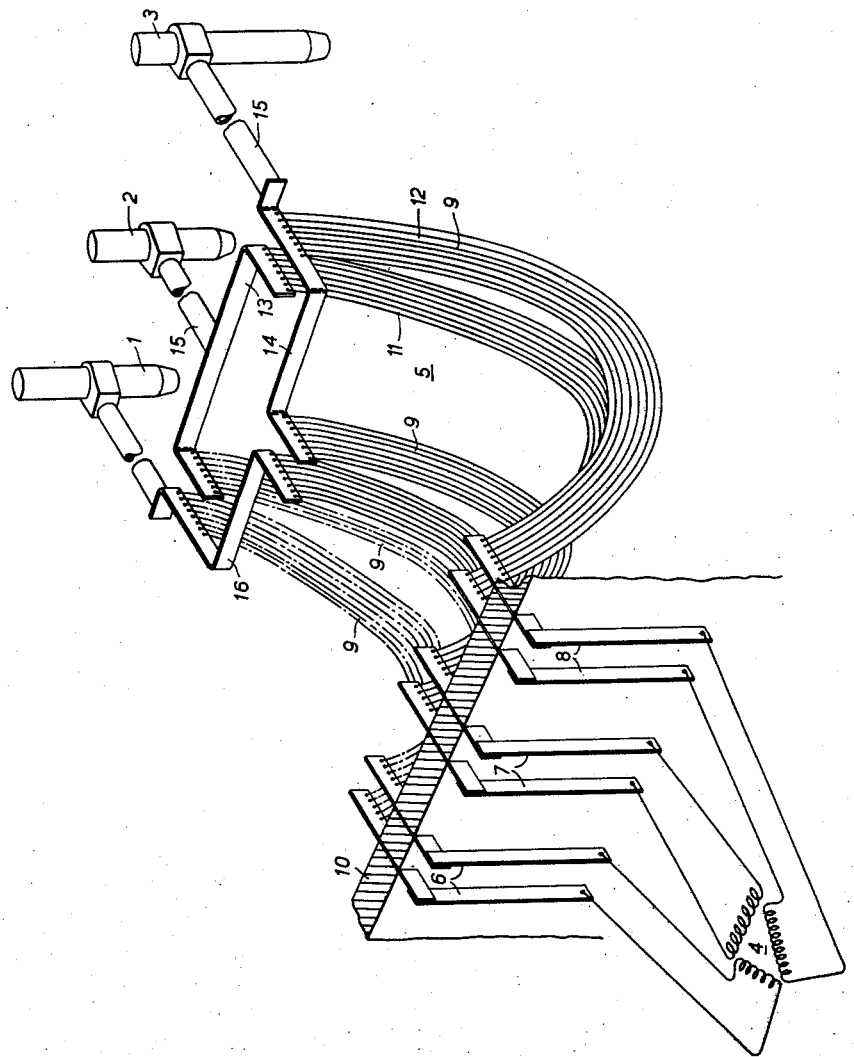
INVENTORS
FRANCIS S.J. LEIGH
EDWARD MAY
ATTORNEY

3,125,622
Patented Mar. 17, 1964

**3,125,622
CONDUCTORS FOR ARC FURNACES**
Francis Simon Joseph Leigh, Sutton Coldfield, and Edward May, Birmingham, England, assignors to Birlec-Efco (Melting) Limited, London, England, a British company
Filed July 14, 1961, Ser. No. 124,141
Claims priority, application Great Britain July 25, 1960
2 Claims. (Cl. 13—9)

This invention relates to the arrangement of flexible conductors connecting the movable electrodes of a polyphase arc furnace to the stationary terminals of a source of polyphase supply for the furnace.

The normal arrangement of conductors in a three-phase arc furnace is to employ three single flexible conductors extending from the respective terminals of the secondary windings of the supply or furnace transformer to the respective electrodes, the arcs at the electrode tips formed during operation constituting a star point for the connected load. Such an arrangement presents an inherently high value of reactance which is particularly significant in the case of large high power furnaces. This high value of reactance arises mainly from the fact that the conductors are, from the point of view of mechanical necessity, widely spaced and do not lie in the best geometric formation for three-phase conductors. Their associated inductances are consequently high and are furthermore unbalanced from the phase-to-phase.

The object of the invention is to provide an arrangement for the conductors which will reduce the reactance presented thereby.

The present invention resides in the use in the furnace transformer of an open-delta secondary winding, the connections from which are led from the transformer in the form of three separate adjacent pairs of single-phase conductors, the single-phase conductors including flexible portions which are connected at their remote ends to respective electrodes in such a manner as to constitute the interphase connections for the secondary windings.

The flexible portions of the conductors will normally each be constituted by a plurality of flexible cables which are thus arranged in six separate groups, two for each phase. The cables in each group are preferably arranged to lie side-by-side, so as to form a flat curtain of one cable in thickness, each phase being thus provided with a pair of curtains of flexible cables arranged to hang closely together with suitable insulation spacing. Since the pair of curtains allocated to each phase are constituted by conductors carrying currents having a 180° phase displacement, the magnetic fields of the conductors in each pair are substantially mutually cancelled. The associated inductance of each pair of curtains is therefore low and the reactance of the system is substantially reduced.

The connections of the flexible portions of the conductors constituting the curtains are made at their remote ends to the electrode supporting arms, by way of connection pieces which bring the three separate phases together in a delta connection, thereby constituting the interphase connections for the secondary windings.

In order that the invention may be more readily understood, reference will now be directed to the accompanying drawing, which illustrates diagrammatically in perspective view the arrangement of the conductors connected to the movable electrodes of a three-phase arc furnace.

Referring to the drawing, the three electrodes of a three-phase arc furnace are shown at 1, 2, 3. They are connected to secondary windings 4 of a furnace transformer by which operating current is supplied to the electrodes by way of a plurality of electrical connections generally indicated at 5. The secondary windings 4 are in open-delta, the connections from the respective phase windings being led from the transformer in the form of three separate adjacent pairs 6, 7, 8, of single-phase conductors, the single-phase conductors including flexible loop portions 9 which permit of relative movement between the arc furnace electrodes and the stationary transformer of which the secondary winding 4 only is diagrammatically indicated. Normally the transformer will be provided in a sub-station of which the wall 10 is shown, the connection 6 being suitably led through the wall 10 as illustrated. Since, however, the electrodes of the furnace have to be arranged for relative movement into and out of the furnace, the flexible connections must be provided between the electrodes and the terminals of the stationary transformer.

The flexible connections from one phase of the secondary winding to the respective electrodes will now be described, the connections including the pair of conductors 8 being taken by way of example. The flexible conductors 9 leading from the terminals of the pair of conductors 8 are in the form of curtains 11, 12, of flexible cables mutually insulated and arranged to hang closely together, the curtains being arranged to hang substantially in parallel relation to one another. The remote ends of the flexible cables constituting the curtains 11, 12, are attached to conducting connection pieces 13, 14, connected to the respective electrodes 2, 3, by way of electrode arms 15.

It will be noted that the connection piece 13 is arranged to interconnect the curtain 11 leading the terminal of one phase of the open-delta secondary winding 4 and also to a similar curtain leading by way of one of the pair of conductors 6 to the adjacent phase of the open-delta secondary winding. The connection piece 13 thus provides the interphase connection for adjacent secondary windings, while the connection pieces 14, 16, constitute the similar interphase connections for the remaining phases. It will be noted that the connection pieces extend transversely of the respective electrode arm to which they are connected, and the connecting piece 13 of the arm 15 is overlapped by and horizontally spaced from the other two connection pieces in non-interfering relationship.

By virtue of the pairs of curtains such as 11, 12, carrying currents having a 180° phase displacement, and being located in closely spaced relation to one another, the associated inductance of each pair is resultingly low. The reactance of the conductors connecting the electrodes to the supply is thereby substantially reduced.

What we claim is:

1. In a three-phase electric arc furnace an electrode system comprising three electrodes relatively movable into and out of the furnace, three electrode arms disposed one intermediate the other two and each supporting one of said electrodes, conducting connection pieces respectively connected to said arms and extending transversely thereof with the connection piece of the intermediate arm overlapped by and horizontally spaced from the other two connection pieces in non-interfering relationship, a stationary three-phase transformer spaced apart from the electrodes with the phases of the secondary winding of the transformer arranged in open delta, a plurality of electrical connections extending from the transformer secondary winding and including a pair of single-phase conductors extending from each phase of the winding, each of said single-phase conductors having a flexible loop portion and the conductors and flexible loop portions of each single-phase conductor pair being located in juxtaposition to each other with the outer end of the flexible loop portion of two of said single-phase conductors from different phases of the winding connected to each connection piece to connect the separate phases of the secondary winding of the transformer in delta.

2. In a three-phase electric arc furnace an electrode system comprising three electrodes relatively movable into and out of the furnace, three electrode arms disposed one intermediate the other two and each supporting one of said electrodes, conducting connection pieces respectively connected to said arms and extending transversely thereof with the connection piece of the intermediate arm overlapped by and horizontally spaced from the other two connection pieces in non-interfering relationship, a stationary three-phase transformer spaced apart from the electrodes with the phases of the secondary winding of the transformer arranged in open delta, a plurality of electrical connections extending from the transformer secondary winding and including a pair of single-phase conductors extending from each phase of the winding, each of said single-phase conductors having a flexible loop portion comprising a plurality of flexible cables mutually insulated and arranged to lie side-by-side in a substantially vertical plane, and the conductors and flexible loop portions of each single-phase conductor pair being located in juxtaposition to each other with the outer end of the flexible loop portion of two of said single-phase conductors from different phases of the winding connected to each connection piece to connect the separate phases of the secondary winding of the transformer in delta.

References Cited in the file of this patent

UNITED STATES PATENTS

| | | |
|---|---|---|
| 2,116,202 | Honegger | May 3, 1938 |
| 2,343,443 | Brooke | Mar. 7, 1944 |

FOREIGN PATENTS

| | | |
|---|---|---|
| 1,036,423 | Germany | Aug. 14, 1958 |